United States Patent [19]

Trapet et al.

[11] Patent Number: 5,610,846
[45] Date of Patent: Mar. 11, 1997

[54] METHOD FOR COORDINATE MEASUREMENT ON WORKPIECES ADJUSTED FOR BENDING OF MEASURING APPARATUS STRUCTURE

[75] Inventors: Eugen Trapet, Bortfeld; Uwe Wiegand, Braunschweig; Günter Grupp, Böhmenkirch; Ralf Bernhardt, Aalen, all of Germany

[73] Assignee: Carl Zeiss Stiftung, Heidenheim, Germany

[21] Appl. No.: 452,803

[22] Filed: May 30, 1995

[30] Foreign Application Priority Data

May 27, 1994 [DE] Germany ............................ 44 18 550.2

[51] Int. Cl.[6] .................................................. G01B 5/012
[52] U.S. Cl. ........................ 364/571.01; 364/560; 73/1 J; 73/849
[58] Field of Search ............................. 364/560, 566, 364/571.01, 571.03, 571.07, 508, 506; 73/1 J, 783, 849, 855, 865.3

[56] References Cited

U.S. PATENT DOCUMENTS

| | | | |
|---|---|---|---|
| 4,333,238 | 6/1982 | McMurtry | 33/508 |
| 4,796,195 | 1/1989 | Haggerty | 364/474.35 |
| 4,819,195 | 4/1989 | Bell et al. | 364/571.05 |
| 5,138,563 | 8/1992 | Debitsch et al. | 364/560 |
| 5,152,072 | 10/1992 | McMurtry et al. | 33/558 |
| 5,189,806 | 3/1993 | McMurtry et al. | 33/503 |
| 5,471,406 | 11/1995 | Breyer et al. | 364/474.29 |

*Primary Examiner*—Emanuel T. Voeltz
*Assistant Examiner*—Kyle J. Choi

[57] ABSTRACT

The method is used to determine the elastic bending behavior of coordinate measuring machines as a result of the measuring force and the position of measuring slides in the measuring range of the machine. Correction values are determined, which are used to compensate for measuring errors caused by machine bending. The correction values are a function of the position of the measuring slides and on the measuring force between the probe of the coordinate measuring machine and workpieces within the measuring range, and are established and stored for several positions. The method can be combined very advantageously with known methods for the correction of guideway errors, which were developed on the basis of a rigid model, and with methods for the dynamic correction of machine deviations caused by vibration of machine components.

15 Claims, 8 Drawing Sheets

FIG. 5a
PARALLEL DISPLACEMENT
$t_y = K_{Py} \cdot F_1$

FIG. 5b
ROTATION
$r_x = K_{Ly} \cdot F_1 \cdot z$

FIG. 5c
SHEARING
$t_y = K_{Sy} \cdot F_1 \cdot z$

FIG. 5d
BENDING
$r_x = K_{Bx} \cdot F_1 \cdot z^2/2$
$t_y = K_{Bx} \cdot F_1 \cdot z^3/3$ FIG. 6a
PARALLEL DISPLACEMENT
$t_z = K_{Pz} \cdot F_2$

FIG. 6b
STRETCHING
$t_z = K_z \cdot F_2$

FIG. 7a
ROTATION

$r_x = K_{Ly} \cdot M_1$

FIG. 7b
BENDING

$r_x = K_{Bx} \cdot M_1 \cdot z$
$t_y = K_{Bx} \cdot M \cdot z^2/2$

FIG. 8a
ROTATION

$r_z = K_{Lz} \cdot M_2$

FIG. 8b
TORSION $r_z = K_T \cdot M_2 \cdot z$

METHOD FOR COORDINATE MEASUREMENT ON WORKPIECES ADJUSTED FOR BENDING OF MEASURING APPARATUS STRUCTURE

BACKGROUND OF THE INVENTION

1. Field of the Invention

The invention relates to a method for coordinate measurement on workpieces using a coordinate measuring machine (CMM) in which the measured data are corrected by means of stored correction values.

2. Relevant Prior Art

To increase the measuring accuracy of CMMs, the measured data, i.e. the coordinate values, supplied by the measuring scales in the machine's axes have been provided for some time now with mathematical corrections. Normally, corrections are taken into account which are a result of the static guideway deviations of the CMM measuring carriages from a straight and orthogonal coordinate system, these deviations being derived according to the so-called "rigid model". Such correction procedures are described, for example in the paper "Numerical Error Correction of a Coordinate Measuring Machine" by K. Busch, H. Kunzmann and F. Wäldele in the Proceedings of the International Symposium on Metrology for Quality Control in Production, Tokyo 1984, pp. 284–288, and in U.S. Pat. No. 4,819, 195.

It is also a known procedure for tactile coordinate measuring machines to determine the amount of probe bending during contact with the workpiece being measured and to take this amount into account in the subsequent coordinate measurement. Such a procedure is described, for example, in paper "Korrektur der Taststiftbiegung bei Messung mit Mehrkoordinaten-Meßgeräten" (Correction of Probe Bending When Measuring with Coordinate Measuring Machines) by A. Weckenmann, G. Goch and H. D. Springborn, in Feinwerktechnik und Meßtechnik 87 (1979) 1, pp. 5–9 and in the paper "Messende Taster mit mehreren Freiheitsgraden" (Measuring Probes with Several Degrees of Freedom) by W. Lotze in Technische Rundschau, issue 50 (1992) pp. 20–25.

In this procedure, the bending tensor of the respective probe is defined by probing a calibration sphere several times using different measuring forces. From this, the correction values for the different probes used in measuring a workpiece are calculated and stored, and taken into account in the coordinate measurements of unknown workpieces.

Furthermore, it is known to correct the dynamic deviations of the measuring slide of a CMM, i.e., the errors which occur due to the fact that the CMM's probe head mounted on the end of the horizontal arm is not at rest, but vibrates about its neutral position as a result of error influences such as drive acceleration, for example. Such a correction procedure is described, for example, in U.S. Pat. No. 4,333,238. Such dynamic correction methods operate with sensors which are mounted in the vicinity of the vibrating probe head and which generate signals representing the course of the spurious oscillation at the moment the probing contact is made.

Finally, error influences in an elastically modeled coordinate measuring machine have been examined in the two thesis papers of Eindhoven University by J. W. U. C. Teeuwsen dated Jan. 27, 1989, see chapter 3, and by H. Soons dated Jun. 16, 1993, see pp. 85–91. However, the authors take into consideration as error sources only the shift of mass due to the mobile measuring slides, ignoring the influence of the measuring or probing forces occurring between the workpiece and the coordinate measuring machine.

As coordinate measuring machines are being built lighter and lighter to achieve higher measuring speeds, elastic distortion of the measuring slides is increasingly gaining importance due to the probing force between the probe and the workpiece. This distortion depends on the extension of the CMM measuring slide and therefore causes deviations of the measured position data of different magnitudes as a function of the position of the probe head within the CMM measuring range.

SUMMARY OF THE INVENTION

It is the object of the invention to further reduce the errors of coordinate measuring machines and thereby to increase the measuring accuracy of such machines. This object is achieved by: determining paramaters characterizing an elastic bending behavior of the coordinate measuring machine for several probe positions within the measuring range by determining components of the parameters, the components being dependent on position of the measuring slide and being at least dependent on a measuring force between the probe and workpieces to be measured; storing the components as correction values, and performing correction calculations by taking into account the stored correction values in subsequent coordinate measurements on workpieces.

The method according to the invention thus takes into account for the first time the flexibility and the elastic behavior of the superstructure and the measuring slides of the CMM; that is, their flexibility due to the forces applied during probing by the workpiece on the CMM probe head. Although these are relatively low and although the distortion of the superstructure of the machine caused by them is only low, they may still appear as measuring errors if the specified measuring uncertainty of the CMM is in the sub-micron range.

Using the correction method according to the invention, the elastic bending behavior of the CMM is determined for several positions of the probe within the measuring range of the CMM. From the measured data for the bending behavior, the correction values are calculated, stored and taken into account in the subsequent measurement of unknown workpieces by the measuring software of the machine, for the coordinate data of the probing points supplied, for example, by the measuring scales and in the preset measuring force. In this manner it is not only possible to reduce the measuring uncertainty of existing CMMs, this new type of correction also permits CMMs to be built with a lighter structure in the future, as the more pronounced elastic distortion of the machine resulting from this lightweight construction can be mathematically compensated for.

It is advisable to compile and store the correction values characterizing the bending behavior in the form of a multi-dimensional correction table, with the capability of interpolating between the stored correction values in the actual correction of the workpiece data. This interpolation also permits the number of correction values of the table to be kept to a minimum.

It is also possible, however, to approximate the local position dependence of the correction value characterizing the bending behavior by means of mathematical functions such as polynomials, for example. In this case it is only necessary to store the coefficients of these approximation functions.

As the bending of the machine structure and the bending of the probe can be described by a bending tensor, and as today the bending tensor for the bending of the probe in high-accuracy CMMs is defined anyway, the locally dependent bending behavior of the CMM can easily be determined by probing a test specimen in different locations of the CMM measuring range. For the determination of the bending tensor it has been found very practical to use a test specimen displaying the shape of a cube corner, for example, which is probed in different locations of the CMM measuring range, with the amount and direction of the measuring force exerted by the probe on the test specimen being varied. In this manner, the elements of the bending tensor can be determined much better and more accurately than by probing a calibration sphere.

It is of particular advantage if the new correction method is used in combination with the known correction method for correcting the static guideway deviation of the measuring slides according to the "rigid model". The expenditure which would otherwise have to be invested in the guideway quality during the construction of the CMM can then be further reduced.

Maximum accuracy can be achieved if, in addition, the dynamic errors of the CMM are also compensated for, in other words, those errors which occur as a result of permanent vibrations of individual machine components and on account of which the position of the probe head mounted on a long, slim horizontal arm, for example, is not precisely defined in space at the moment the probing contact is made. These positional deviations can best be detected in an interval starting prior to probing and data acquisition by means of sensors, and from the signals of these sensors the dynamic correction values can be calculated which contribute to a further accuracy enhancement of the CMM, this being described in Patent Application Ser. No. 08/353,595 filed Dec. 12, 1994, of the present inventors' assignee, with the title "Method and Device for the Correction of Measurement Errors Due to Vibrations in Coordinate Measuring Devices", and in the previously mentioned U.S. Pat. No. 4,333,238. The combination of the new correction method for elastic deviations with the method for correcting dynamic deviations are of particular advantage for horizontal-arm measuring machines equipped with a so-called touch trigger probe head. This is because in this type of machine particularly pronounced elastic distortion occurs as a function of the measuring slide position. In addition, the vibration-related position uncertainty at the moment the probing contact is made is especially high due to the briefness of contact between the touch trigger probe and the workpiece.

Using the combination of the three above-mentioned correction methods, i.e., the new method for correcting machine bending according to the present invention, the known statistical guideway error correction according to the "rigid model" and the known correction of dynamic error, very low, previously unattainable measuring uncertainties can be achieved for the CMM.

BRIEF DESCRIPTION OF THE DRAWINGS

The present invention will now be described in the following detailed description, taken together with the drawings, in which:

FIGS. 5a–8b are schematic diagrams illustrating the possible elastic distortions of a crossbar;

FIGS. 15a–16d are diagrams comparing the linear measuring uncertainties of the CMM according to FIG. 10 which were measured on a step gauge for different coordinate measurements with and without the correction of elastic errors.

DETAILED DESCRIPTION OF PREFERRED EMBODIMENTS

Before dealing in detail with the correction of elastic measuring deviations of a CMM, these elastic deviations will be defined to differentiate them from the guideway errors which are already corrected according to the so-called "rigid model" in conformity with the state of the prior art mentioned in the introduction. The known guideway errors of the "rigid model" are a function of the position of the probe head, or of the respective measuring slide in the motion axis in question. Translation and rotation errors, for example, are identified in this manner by specifying the type of error and the two axes, namely the motion axis and the error axis. A lateral displacement (translation) in the Y-direction when the "X" measuring slide is moved along the measuring axis X is normally described as xTy, and a rotation, such as a pitch about the Y-axis when moving in the X-direction, as xRy. It would, however, be more correct to use the descriptions xTy(x) and xRy(x) in these cases, as this would be an unambiguous mathematical indication of the dependence on the translation coordinate. The first character thus specifies the corrected term of the kinematic chain, i.e., the respective guideway direction, the second differentiates between the error components in translation and rotation and the third indicates the displacement direction or the axis of rotation.

Elasticity-related measuring deviations of the CMM, on the other hand, are a result of distortion of individual components in a term of the kinematic chain, with this distortion not being solely a function of the position in the motion axis in question. Instead, it depends on different variables, e.g. on probing force F, acceleration $\vec{a}$ and the position of other measuring slides perpendicularly to the actual guideway direction to be corrected. The following holds, for example, for the roll about its own axis of the measuring slide guided in the X-direction according to the elastic model xRx(x,z,y,F,a)=. . . , which describes the functional dependence of this error component on additional influences like the probing force F, acceleration a and the present position of the measuring slides in the Z- and Y-directions.

In the following discussion, the theoretical principles are described using FIGS. 1–9 as examples. The correction of elasticity-related geometric dimensions can be performed on the basis of these principles. To elucidate these principles, the description focuses on a horizontal-arm CMM. Furthermore, additional approaches for elastic deviations are described which do not occur in horizontal-arm CMMs, but which may have an influence on CMMs of other geometric designs.

Figure 1:
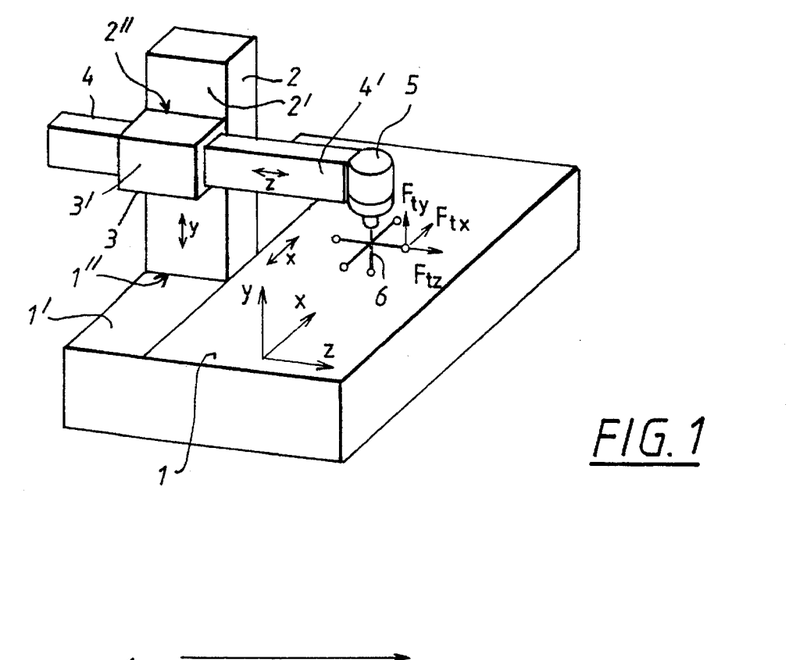
FIG. 1 illustrates the basic design principle of the horizontal-arm type CMM.

FIG. 1 outlines the fundamental design of a horizontal-arm CMM. It consists of a machine table (1) with guideway (1') for the column (2) which is movable in the X-direction. On column (2) a vertically movable cross slide (3) is mounted on bearings in the Y-direction on guideway (2'). A horizontal arm or spindle (4) glides in the bearings (3') of cross slide (3), with its guideways (4') in the direction of arrow Z. At its front end it carries the probe head (5) with the flexibly mounted probe (6). The bearing gaps between the four components of the kinematic chain, in other words table (1), column (2), cross slide (3), and spindle (4) are labeled with the reference markings (1", 2" and 3").

If the distortion of each term of this kinematic chain is to be described in general, the following would hold:

$$\begin{bmatrix} T_i \\ R_i \end{bmatrix} = \underline{A_i} \cdot \begin{bmatrix} F_i \\ M_i \end{bmatrix} \quad (1)$$

with:

$$\underline{T_i} = \begin{bmatrix} T_x \\ T_y \\ T_z \end{bmatrix} \equiv \text{vector of translation deviations} \quad (2)$$

$$\underline{R_i} = \begin{bmatrix} R_x \\ R_y \\ R_z \end{bmatrix} \equiv \text{vector of rotation deviations} \quad (3)$$

$$\underline{F_i} = \begin{bmatrix} F_x \\ F_y \\ F_z \end{bmatrix} \equiv \text{vector of applied forces} \quad (4)$$

$$\underline{M_i} = \begin{bmatrix} M_x \\ M_y \\ M_z \end{bmatrix} \equiv \text{vector of applied moments} \quad (5)$$

$$\underline{A_i} = \begin{vmatrix} \frac{\delta tx}{\delta F_x} & \frac{\delta tx}{\delta F_y} & \frac{\delta tx}{\delta F_z} & \frac{\delta tx}{\delta M_x} & \frac{\delta tx}{\delta M_y} & \frac{\delta tx}{\delta M_z} \\ \frac{\delta ty}{\delta F_x} & \frac{\delta ty}{\delta F_y} & \frac{\delta ty}{\delta F_z} & \frac{\delta ty}{\delta M_x} & \frac{\delta ty}{\delta M_y} & \frac{\delta ty}{\delta M_z} \\ \frac{\delta tz}{\delta F_x} & \frac{\delta tz}{\delta F_y} & \frac{\delta tz}{\delta F_z} & \frac{\delta tz}{\delta M_x} & \frac{\delta tz}{\delta M_y} & \frac{\delta tz}{\delta M_z} \\ \frac{\delta rx}{\delta F_x} & \frac{\delta rx}{\delta F_y} & \frac{\delta rx}{\delta F_z} & \frac{\delta rx}{\delta M_x} & \frac{\delta rx}{\delta M_y} & \frac{\delta rx}{\delta M_z} \\ \frac{\delta ry}{\delta F_x} & \frac{\delta ry}{\delta F_y} & \frac{\delta ry}{\delta F_z} & \frac{\delta ry}{\delta M_x} & \frac{\delta ry}{\delta M_y} & \frac{\delta ry}{\delta M_z} \\ \frac{\delta rz}{\delta F_x} & \frac{\delta rz}{\delta F_y} & \frac{\delta rz}{\delta F_z} & \frac{\delta rz}{\delta M_x} & \frac{\delta rz}{\delta M_y} & \frac{\delta rz}{\delta M_z} \end{vmatrix} \begin{matrix} \text{distortion} \\ \text{matrix} \\ \text{for the } i\text{-th} \\ \equiv \text{term of the} \\ \text{kinematic} \\ \text{chain} \end{matrix} \quad (6)$$

Figure 3:
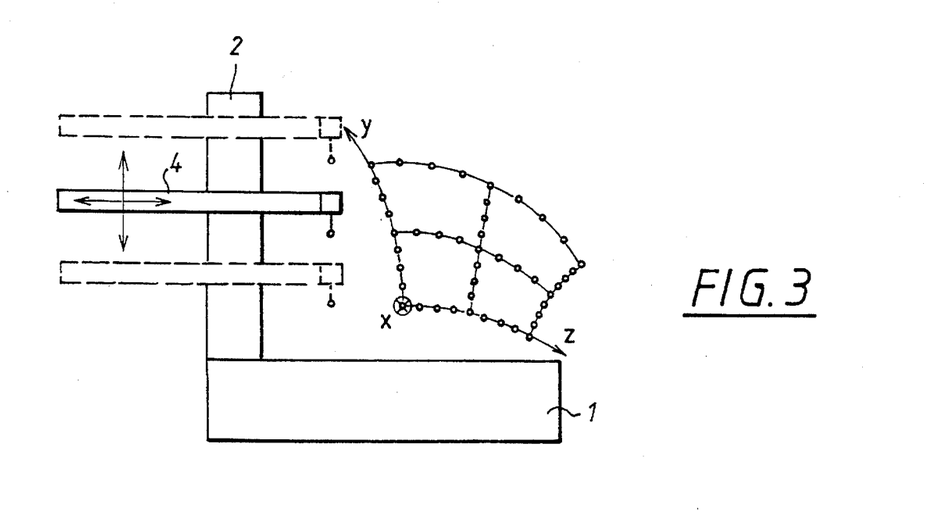
FIG. 3 is a schematic diagram which illustrates the CMM coordinate system of FIG. 1 distorted as a result of the position of spindle (4)

The point of application for the forces and moments acting on the individual components of the CMM is always assumed to be where two successive links of the kinematic chain are connected, in other words in the bearing gaps (1", 2", 3"). Since "elastic distortion" in a specific term of the kinematic chain of the CMM is, as per definition, always caused by loads occurring in a higher or lower term of the chain, this presentation is generally valid and complete. Let us use the spindle (4) as an example. As a result of flexibility, it is subjected to distortion from its own weight. This, however, is not an "elastic" deviation in the sense of the definition in question, as this distortion is entirely a function of the projection of spindle (4) in the Z-direction. What does happen, however, is that this weight shift is also transmitted to the column (5) in the form of a moment which depends on the position of spindle (4). As both the torque and the point of application on the column may vary independently of each other, an "elastic" error occurs in the vertical motion axis, the Y-axis, which distorts the coordinate system of the CMM as shown in FIG. 3. The example of FIG. 3 clearly shows that the curvature of the motion axes in the direction of coordinates y and z depends on the position of the spindle (4) in the Z-direction.

Figure 2:
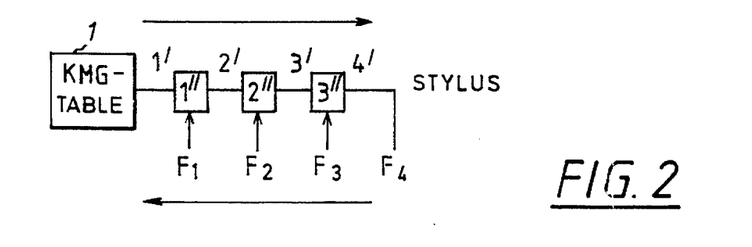
FIG. 2 is a simplified illustration of the kinematic chain of the CMM according to FIG. 1.

As can be seen from equation (1), the result of this general description consists of the vectors of the translation and rotation deviations $T_i$ and $R_i$. This makes it possible to describe the elasticity-related errors in a manner so as to be compatible with existing correction methods for guideway errors according to the rigid model (see the state of the prior art described in the introduction), i.e., by six degrees of freedom for each motion axis. FIG. 2 illustrates this method. The structural distortion within the connecting elements of the kinematic chain between machine table (1) and probe (6) is transformed to the sites of origin of the "classical" component errors, in other words, in those compensated for according to the "rigid model", that is in the bearing gaps (1",2",3") of the motion axes.

By this method, the compilation of correction algorithms for the elastic deviations of a CMM is restricted to the analysis of functional interrelations, which are represented by the differential coefficient of the distortion matrix $A_i$ according to equation (6).

Figure 4:
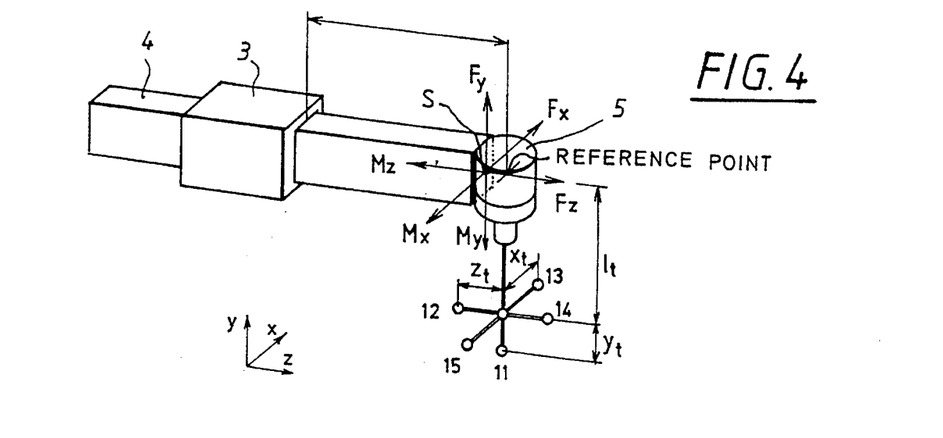
FIG. 4 shows the spindle (4) of the CMM of FIG. 1 in an enlarged scale.
Figure 5A:
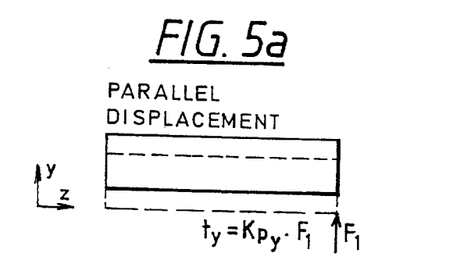
Figure 5B:
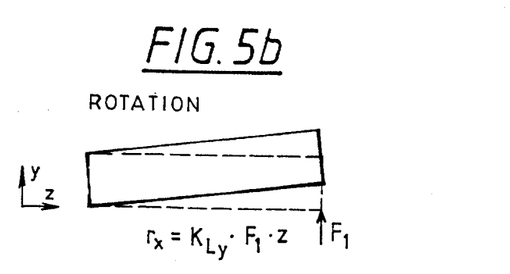
Figure 5C:
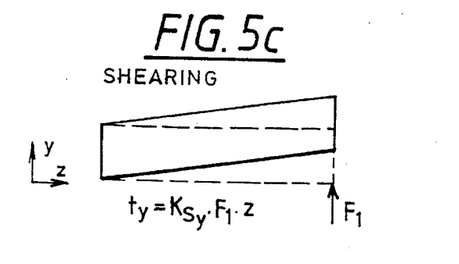
Figure 5D:
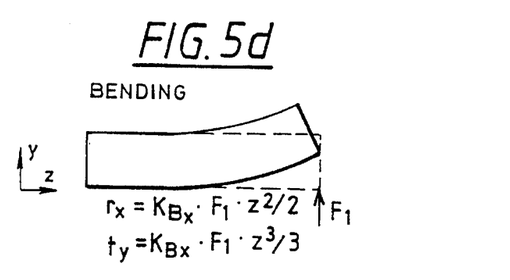

The quantitative determination of the elements can always be performed in different ways, for example:

a) By analytical numeric procedures from the design data of the CMM component in question.

b) Purely metrologically, by measuring the bending behavior of the CMM and approximating it with polynomial statements. This procedure will be described later based on FIGS. 10–16 for a portal-type CMM.

c) By analytical approaches which take into account the physical behavior of the CMM components. Based on these approaches, the coefficients of the distortion matrix $A_i$ can be calculated with relatively little metrological expenditure using the previously compiled functions. Adopting this method, one proceeds as follows:

Generation of a Distortion Matrix This is done in several steps:

1. For the component in question, for example for spindle (4), the general distortion matrix $A_i$ is compiled according to equation (6) by establishing the relation between the load and the distortion in translation or rotation of the component. If one of the distortions fails to occur under the assumed load, the element in question of matrix $A_i$ is reset to zero.

2. Suitable measuring procedures must be established to obtain quantitative information on the coefficients of matrix $A_i$ by polynomial approximation of the measured data, for example.

For a crossbar supported one-sidedly and elastically in bearings, as spindle (4) of the CMM in FIG. 1, for example, a distortion catalog can be compiled with which the terms of mechanical distortion can be easily assigned. In this catalog, the main components are illustrated in FIGS. 5–8, the four main loads on a bending bar are taken into account, these being:

a) force application perpendicularly to bar axis
b) force application parallel to bar axis
c) moment application perpendicularly to bar axis
d) moment application parallel to bar axis From this, the following terms result:

a) If force is applied perpendicularly to the bar axis:

| parallel displacement | $t_y = K_{py} \cdot F_1$ | (FIG. 5a) |
|---|---|---|
| rotation | $r_x = K_{Ly} \cdot F_1 \cdot z$ | (FIG. 5b) |
| shear | $t_y = K_{Sy} \cdot F_1 \cdot z$ | (FIG. 5c) |
| bending | $r_x = K_{Sx} \cdot F_1 \cdot z^2/2$ | |
| and | $t_y = K_{Sx} \cdot F_1 \cdot z^3/3$ | (FIG. 5d) | b) If force is applied parallel to the bar axis:

| parallel displacement | $t_z = K_{Pz} \cdot F_2$ | (FIG. 6a) |
|---|---|---|
| expansion | $t_z = K_z \cdot F_2$ | (FIG. 6b) | c) If force is applied perpendicularly to the bar axis:

| rotation | $r_x = K_{Ly} \cdot M_1$ | (FIG. 7a) |
|---|---|---|
| bending | $r_x = K_{Sx} \cdot M_1 \cdot z$ | |
| and | $t_y = K_{Sx} \cdot M_1 \cdot z^2/2$ | (FIG. 7b) | d) For the axial moment:

| rotation | $r_z = K_{Lz} \cdot M_2$ | (FIG. 8a) |
|---|---|---|
| torsion | $r_z = K_T \cdot M_2 \cdot z$ | (FIG. 8b) |

In mechanical terms, r always indicates a rotation and t a translation about or along the axis marked with the index. K signifies the coefficients responsible for the respective distortion, F the applied forces and M the applied moments. The individual terms for the bending bar are derived from the classical mechanical formulae, as the ones described in standard mechanical engineering handbooks, e.g. the Dubbel Handbook for Mechanical Engineers, Volume I, Section "Strength of Materials", Chapter III "Bending".

Distortion Matrix for Spindle

FIG. 4 shows the geometric conditions that can be found on the spindle of a horizontal-arm CMM.

When a general distortion matrix for spindles is compiled, not only the spindle position is taken into account, but also the probing forces, probing directions, and varying probe lengths and directions.

The probing forces are always shifted to a reference point. This point is the intersection of the neutral fiber, in other words the symmetry axis of the spindle, and the center axis of the probe head. The load on the bar is applied in the reference point and consists of the probing force and one moment, which is the result of the probing force shift to the reference point.

To describe the bending of the spindle as a result of the probing forces, the translation and rotation portions are calculated for the reference point to which all "classical error components" are also referred.

The bending of the spindle as a result of probing forces is assigned to the respective translation portions.

In the following, two examples are given which are illustrated in FIG. 4.

1. A force is applied in the X-direction to probe (14). One of the effects of this force is that the spindle is rotated in the bearing. To calculate the probe tip deflection resulting from this rotation, the angle of rotation must be multiplied by the distance $z+z_t$. In this case, an assignment must be made to a translation error. If the rotation were to be declared as ZRY, which would be possible from the system, an exact calculation of the probe tip deflection would not be possible, as the rotation errors of the spindle are only multiplied by the probe lengths.

2. A force is applied in the Z-direction to probe (13). This means that the spindle is also subjected to the load of a moment. One of the effects of this moment is a bending of the spindle, causing the probe head to be twisted through a specific angle. To be able to calculate the probe tip deflection caused by the twist, the angle needs to be multiplied by the probe length only. This error can thus be treated as ZRY.

The resulting general distortion matrix is therefore as follows:

$$A_p = \begin{vmatrix} \frac{\delta tx}{\delta F_x} & 0 & 0 & 0 & \frac{\delta tx}{\delta M_y} & \frac{\delta tx}{\delta M_z} \\ 0 & \frac{\delta ty}{\delta F_y} & 0 & \frac{\delta ty}{\delta M_x} & 0 & 0 \\ 0 & 0 & \frac{\delta tz}{\delta F_z} & \frac{\delta tz}{\delta M_x} & 0 & 0 \\ 0 & \frac{\delta rx}{\delta F_y} & 0 & \frac{\delta rx}{\delta M_x} & 0 & 0 \\ \frac{\delta ry}{\delta F_x} & 0 & 0 & 0 & \frac{\delta ry}{\delta M_y} & 0 \\ 0 & 0 & 0 & 0 & 0 & \frac{\delta rz}{\delta M_z} \end{vmatrix} \quad (7)$$

The elements of this matrix must now be filled with the appropriate terms by using the distortion catalog for bending bars as per FIGS. 5–8. The individual terms for the differential coefficients are:

$$\frac{\delta tx}{\delta F_x} = F_x \cdot \left[ K_{By} \cdot \left( \frac{z^n}{3} + \frac{4}{15} \cdot h^2 \cdot z \right) + K_{Lx} \cdot z \cdot (z+z_t) + K_{Px} \right]$$

$$\frac{\delta ty}{\delta F_y} = F_y \cdot \left[ K_{Bx} \cdot \left( \frac{z^n}{3} + \frac{4}{15} \times h^2 \cdot z \right) + K_{Ly} \cdot z \cdot (z+z_t) + K_{Py} \right]$$

$$\frac{\delta tz}{\delta F_z} = F_z \cdot [K_{Pz} + K_z]$$

$$\frac{\delta rx}{\delta F_y} = F_y \cdot K_{Bx} \cdot \frac{z^2}{2}$$

$$\frac{\delta ry}{\delta F_x} = F_x \cdot K_{By} \cdot \frac{z^2}{2}$$

$$\frac{\delta tx}{\delta M_y} = F_x \cdot z_t \cdot \left[ K_{By} \cdot \frac{z^2}{2} + K_{Lx} \cdot (z+z_t) \right]$$

$$\frac{\delta tx}{\delta M_z} = F_x \cdot (l_t - y_t)^2 \cdot (K_{Lx} + K_T \cdot z)$$

$$\frac{\delta ty}{\delta M_x} = F_y \cdot z_t \cdot \left[ K_{Bx} \cdot \frac{z^2}{2} + K_T \cdot (z+z_t) \right]$$

$$\frac{\delta tz}{\delta M_x} = F_z \cdot (l_t - y_t) \cdot \left[ K_{Bx} \cdot \left[ \left( \frac{z^2}{2} + z \cdot (l_t - y_t) \right) \right] + K_{Ly} \cdot (l_t - l_y) \right]$$

$$\frac{\delta rx}{\delta M_x} = F_y \cdot z_t^2 \cdot K_{Bx} \cdot z$$

$$\frac{\delta ry}{\delta M_y} = F_x \cdot z_i^2 \cdot K_{By} \cdot z$$

$$\frac{\delta rz}{\delta M_z} = F_z \cdot x_i^2 \cdot (K_T \cdot z + K_{Lz})$$

The calculation of the individual elements is always made with a positive sign (all constants are amounts). The measured data of a probing process is always falsified in the probing direction, therefore the correction values must be given a sign which is the opposite of the probing direction.

Distortion Matrix for Column

Figure 9:
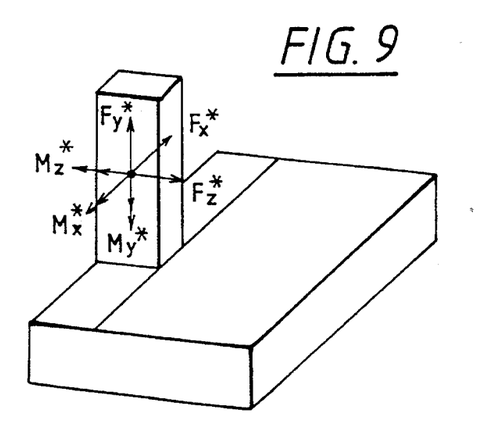
FIG. 9 illustrates the forces and moments acting on the column (2) of the CMM according to FIG. 1.

When assuming the load for the column, the same method was adopted as for the spindle. The forces and moments acting on spindle (4) (including the load of its own weight) are transformed into a reference point. This is located at column (2) in the center of cross slide (3). FIG. 9 shows the load of column (2) after this transformation.

These forces and moments result from the sum total of the loads (probing forces) acting on the spindle and from the transfer of the spindle's own weight. To differentiate between the loads of the column and the spindle, the asterisk (*) was introduced.

The relatively complex structure of the column and the deflection of the cross slide at the column results in a slight torsion of the column, which is a function of the spindle position (Z-position) and the position of the cross slide (Y-position). We are thus dealing here with a Z-dependent rolling of the Y-axis. For this reason, the matrix element $\delta ry/\delta M_x^*$ was provided. It is difficult to provide a physical model of this torsion behavior and it must therefore be approximated by a function derived empirically from the appropriate measurements.

The general distortion matrix for the column thus reads:

$$\underline{A}_{St} = \begin{vmatrix} \frac{\delta tx}{\delta F_x^*} & 0 & 0 & 0 & 0 & \frac{\delta tx}{\delta M_z^*} \\ 0 & \frac{\delta ty}{\delta F_y^*} & 0 & 0 & 0 & 0 \\ 0 & 0 & \frac{\delta tz}{\delta F_z^*} & \frac{\delta tz}{\delta M^*} & 0 & 0 \\ 0 & 0 & \frac{\delta rx}{\delta F_z^*} & \frac{\delta rx}{\delta M_x^*} & 0 & 0 \\ 0 & 0 & 0 & \frac{\delta ry}{\delta M_x^*} & \frac{\delta ry}{\delta M_y^*} & 0 \\ \frac{\delta rz}{\delta F_x^*} & 0 & 0 & 0 & 0 & \frac{\delta rz}{\delta M_z^*} \end{vmatrix} \quad (8)$$

The terms for the column are:

$$\frac{\delta tx}{\delta F_x^*} = F_x^* \cdot \left( K_{Bz}^* \cdot \frac{y^n}{3} + \frac{4}{15} \cdot K_{Bz}^* \cdot h_{St}^2 \cdot y \right)$$

$$\frac{\delta tx}{\delta M_z^*} = M_z^* \cdot K_{Bz}^* \cdot \frac{y^2}{2}$$

$$\frac{\delta ty}{\delta F_y^*} = F_y^* \cdot K_y^*$$

$$\frac{\delta tz}{\delta F_z^*} = F_z^* \cdot \left( K_{Bx}^* \cdot \frac{y^n}{3} + \frac{4}{15} \cdot K_{Bx}^* \cdot h_{St}^2 \cdot y \right)$$

$$\frac{\delta tz}{\delta M_x^*} = M_x^* \cdot K_{Bx}^* \cdot \frac{y^2}{2}$$

$$\frac{\delta rx}{\delta F_z^*} = F_z^* \cdot K_{Bx}^* \cdot \frac{y^2}{2}$$

$$\frac{\delta rx}{\delta M_x^*} = M_x^* \cdot K_{Bx}^* \cdot y$$

$$\frac{\delta ry}{\delta M_y^*} = M_y^* \cdot K_{Ty}^* \cdot y$$

$$\frac{\delta rz}{\delta F_x^*} = F_x^* \cdot K_{Bz}^* \cdot \frac{y^2}{2}$$

$$\frac{\delta rz}{\delta M_z^*} = M_z^* \cdot K_{Bz}^* \cdot y$$

The nomenclature of the matrix elements is designed in a way that if the "δ" of the numerator is exchanged for a "Y" the designation of the "classical" error component is obtained, which is superimposed on the elastic influence.

Distortion Matrix for Table

In the listing of the individual terms, the flexibility effects of the column bearings have not yet been taken into account. The reason for this is that these "elastic" errors can simply be assigned to the rotation and translation error of the X-guideway. This assignment is logical, because the flexibility of the column bearings has an effect on all subsequent links of the kinematic chain, as have the rotation errors of the X-axis.

The general distortion matrix of the table reads as follows:

$$\underline{A}_{LSt} = \begin{vmatrix} \frac{\delta tx}{\delta F_x^*} & 0 & 0 & 0 & 0 & 0 \\ 0 & \frac{\delta ty}{\delta F_y^*} & 0 & 0 & 0 & 0 \\ 0 & 0 & \frac{\delta tz}{\delta F_z^*} & \frac{\delta tz}{\delta M_x^*} & 0 & 0 \\ 0 & 0 & 0 & \frac{\delta rx}{\delta M_x^*} & 0 & 0 \\ 0 & 0 & 0 & 0 & \frac{\delta ry}{\delta M_y^*} & 0 \\ 0 & 0 & 0 & 0 & 0 & \frac{\delta rz}{\delta M_z^*} \end{vmatrix} \quad (9)$$

The individual terms for these errors are obtained from the constants for the respective bearing flexibility. They are:

$$\frac{\delta tx}{\delta F_x^*} = F_x^* \cdot K_{Px}^*$$

$$\frac{\delta ty}{\delta F_y^*} = F_y^* \cdot K_{Py}^*$$

$$\frac{\delta tz}{\delta F_z^*} = F_z^* \cdot K_{Pz}^*$$

$$\frac{\delta rx}{\delta M_x^*} = M_x^* \cdot K_{Lx}^*$$

$$\frac{\delta ry}{\delta M_y^*} = M_y^* \cdot K_{Ly}^*$$

$$\frac{\delta rz}{\delta M^*} = M_z^* \cdot K_{Lz}^*$$

The decimal signs of the table errors are obtained in the same way as defined for the 18(+3) errors of the "rigid model".

The approach as described so far permits good correction of the elastic effects of the table, the column and the spindle, which have a significant influence on the measuring uncertainty.

Approach for the Correction of Elasticity-Related Roll

If the CMM guideway of the first axis (mostly the X-axis) is particularly liable to bending, the rotation about the X-axis caused by the telescoping of the spindle may, in addition, be a function of the X-position. This error occurs, for example, in large horizontal-arm measuring machines with a cast foundation, and primarily in portal-type CMMs. If one takes it that this elasticity-related roll in the X-guideway is caused by a moment which depends on the Z-position, and that the X-guideway displays a flexibility characteristic N'(x), the spindle has the following load force A≡:

$$\frac{\delta rx}{\delta M_x^*} = M_x^* \cdot N_R'(x) \quad (10)$$

$$M_x^*(Z) = A \cdot Z \quad (11)$$

$$XRX(X,Z) = N_R'(X) \cdot A \cdot Z$$

$$XRX(X,Z) = N_{Rx}(X) \cdot Z \quad (12)$$

In order to be able to determine the flexibility coefficient in equation (12), the course of the roll angle must be measured in two different Z-positions. From the difference between these two roll angle measurements, the coefficient $N_{rx}$ is determined.

This calculation is based on the assumption that the center of motion of the roll is fixed. If this is not the case, a translation shift must be applied independently of X and Z. The following holds:

$$\frac{\delta ty}{\delta M_x^*} = M_x^* \cdot N_{Ty}'(x)$$

$$\frac{\delta tz}{\delta M^*} = M_x^* \cdot N_{Tz}'(x)$$

$$XTY(X,Z) = N_{Ty}(X) \cdot Z \quad (13)$$

$$XTZ(X,Z) = N_{Tz}(X) \cdot Z \quad (14)$$

With the help of equations 12, 13 and 14 it is now possible to also correct the roll error, which is a function of the: spindle position along the X-guideway due to elastic effects.

Measurement of Elastic Distortion and Determination of the Coefficients

The constants given in the above equation can be established by metrologically determining the different elastic distortions of the CMM as a function of the appropriate axial positions. The constants can then be determined mathematically from the results by approximation. The distortion of spindle (4), for example, can be determined by measuring a precision sphere, the procedure being that the sphere diameter is measured by probing it in the X-direction using a probe projecting in the Y-direction. Similarly, the sphere diameter is measured in the Y-direction using a probe projecting in the Z-direction. In this manner, the different flexibilities caused by the probing force between the workpiece and the probe tip can be separated. It might be advisable to use probe extensions to intensify the leverage effects.

The following table shows the relation between the probing direction, the probe selected for the measurement, and the resulting elastic distortion of spindle (4) of the CMM. The measurements of a calibration sphere described above are sufficient to determine all coefficients contained in the distortion matrix of the spindle as per equation (7). Approximation of the measured data can be performed in accordance with the least squares errors method.

TABLE

|  | Bending about X | Bending about Y | Torsion | Expansion/ Compression |
|---|---|---|---|---|
| Probe 11 | $F_z, F_y$ | $F_x$ | $F_x$ | $F_z$ |
| Probe 12 | $F_y, F_z$ | $F_x$ | $F_x$ | $F_z$ |
| Probe 13 | $F_y$ | $F_x, F_z$ | $F_x, F_y$ | $F_z$ |
| Probe 14 | $F_y, F_z$ | $F_x$ | $F_x$ | $F_z$ |
| Probe 15 | $F_y$ | $F_x, F_z$ | $F_x, F_y$ | $F_z$ |

The column bending can best be determined by measuring the tilt angle by means of an inclination interferometer. A suitable measuring set-up must be used to ensure that the bending of column (2) and the flexibility of the bearings are measured separately from each other. Different Z-positions are measured along the Y-axis to determine the bending of the column. The flexibility of the bearings, on the other hand, is simply determined by measuring the tilt of the column once in the Z-direction while the column is moving and when the cross slide is at its lowest position. This measuring line is sufficient, because the influence of column bending is not yet very pronounced in the lowest Y-position of the spindle.

Normally, the knowledge of effective forces and moments makes it possible to decide without a measurement which parameters should and which parameters should not be taken into account for the bending correction. It can be assumed, for example, that parallel bearing shifts are negligible, with expansion, compression and shear also contributing very little to machine distortion. In a CMM of the afore-mentioned horizontal-arm type, the following effects should normally be subjected to correction:

Distortion Due to Probing Force

It has been found that elastic probing effects in the direction of the X- and Y-axes should be corrected. Thereby, distortion of the spindle occurs in the form of bending and torsion, which, considering the slim design of this measuring slide, is to be expected. Also, the bending of the column must be taken into account, which occurs when cross slide (3) is moved vertically, i.e., in the Y-direction, with spindle (4) projecting by a larger amount.

Once the individual flexibility coefficients for the previously-mentioned essential elastic effects have been determined, they can be included as correction values in an appropriately edited program module, which performs the correction of elasticity-related machine distortion. Here, it is recommended that this module for the correction of elastic machine distortion should always precede the classical geometric correction module which compensates for guideway errors by adopting the known "rigid model" for guideway error correction, so that the "elastically" corrected CMM will then display the behavior of a rigid CMM. The elastic deviation must then be calculated with the help of the distortion matrix for each probing action when an unknown workpiece is measured, as the flexibility of the machine structure changes with every axial motion of the CMM. If the elastic deviation of a horizontal-arm CMM is to be corrected as described above, while simultaneously performing a correction of the "classical" errors according to the "rigid model", the following order should consequently be maintained:

1. Reading of scales and transfer of additional information (probing force, probe lengths);
2. Calculation of spindle distortion;
3. Calculation of deviations caused by spindle distortion;
4. Calculation of column distortion;
5. Calculation of X-guideway distortion (bearing flexibility);
6. Calculation of the overall deviations caused by elastic effects;
7. Determination of the deviations caused by geometric errors in the CMM according to the "rigid model";
8. Adding up of deviations caused by geometric and elastic effects.

Figure 6A:
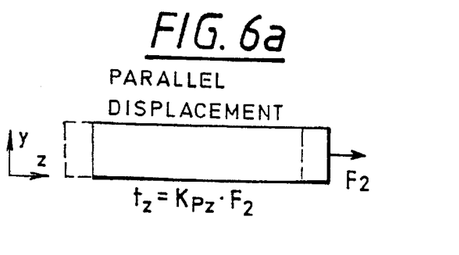
Figure 6B:
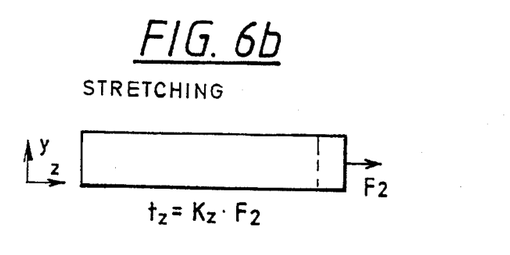
Figure 7A:
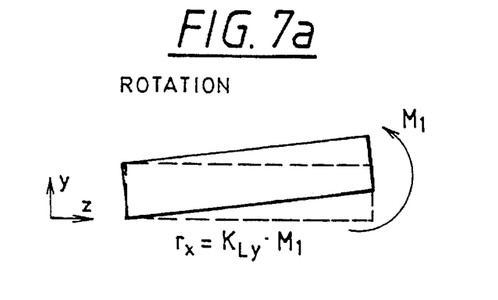
Figure 7B:
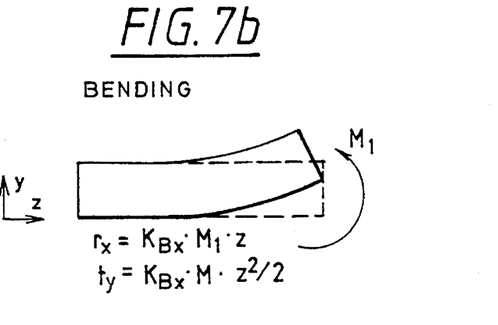
Figure 8A:
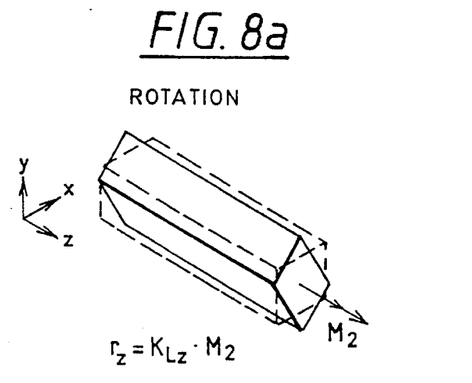
Figure 8B:
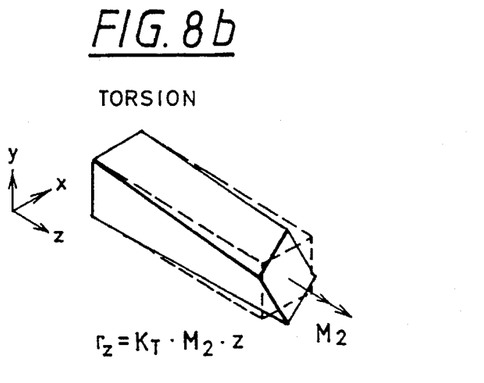

By adopting the above method, elastic distortion of the CMM column originally amounting to about 4.5 μm can be reduced to less than 1.5 μm. At the same time, position errors of the probe head on the spindle as a result of probing forces, which originally were as much as up to 6 μm, can be reduced to less than 2 μm by this correction method with the condition remaining unchanged. Using the afore-mentioned error model, a horizontal-arm CMM of the type USMC 120810 of the firm Carl Zeiss, the inventors' assignee, was corrected completely with a view to elastic distortion errors and at the same time to classical guideway errors according to the "rigid model". The results of the measurements performed afterwards showed that the systematic elastic errors in the measuring volume of $(760 \text{ mm})^3$ had been reduced to the order of random errors. The residual systematic elastic errors contributed to the measuring uncertainty with 1.5 μm, which is negligible compared to the probing uncertainty of 3 μm for systematic and random components. A further reduction of error components of a horizontal-arm CMM can only be achieved if the dynamic error components caused by vibration of the machine structure are also measured and corrected, for example by means of sensors in the vicinity of probe head (6), whose signals pick up the present acceleration and thus the state of motion of the probe head oscillating with an amplitude of a few μm.

Figure 10:
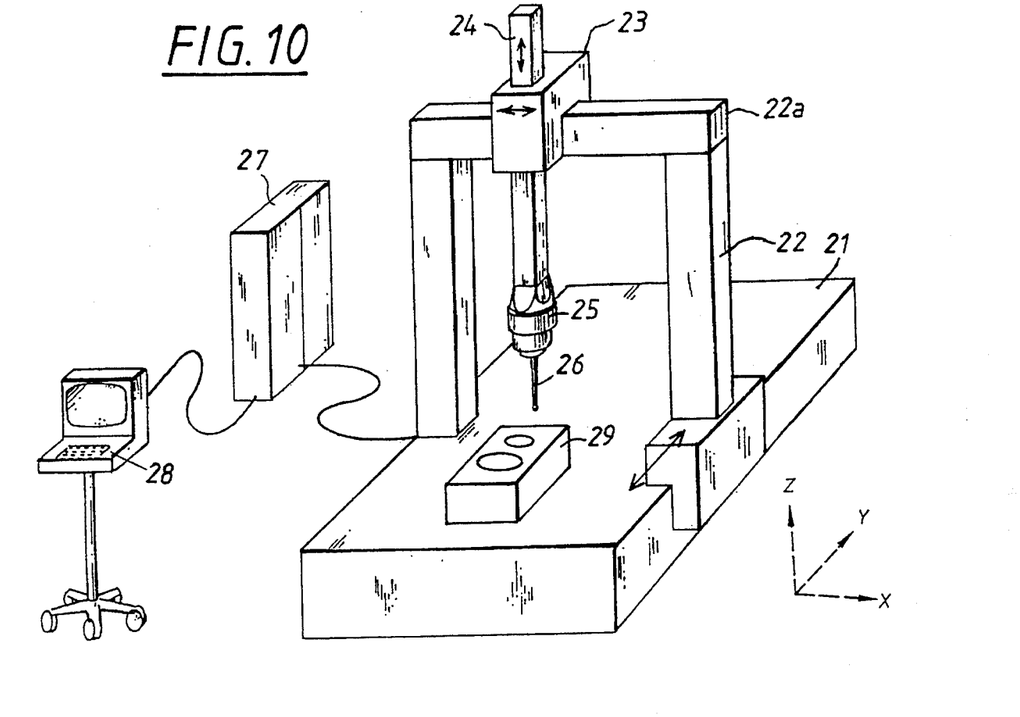
FIG. 10 outlines the basic design of a portal-type CMM.
Figure 11A:
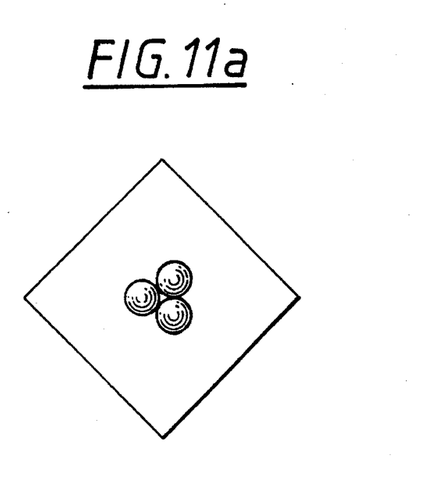
FIGS. 11a and 11b show test specimens of the type of a ball triplet (FIG. 11a) and a roller triplet (FIG. 11b)
Figure 11B:
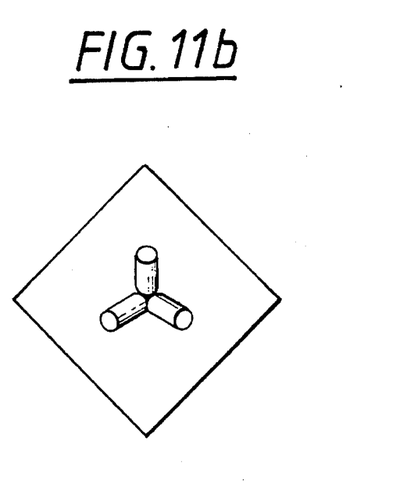

In the following, FIGS. 10–16 are used to explain how the essential distortions can be corrected in a portal-type CMM. However, it is not the analytical approach for quantitatively determining the elements of the distortion matrix selected for the horizontal-arm CMM as per FIGS. 1–9 which is adopted, but a purely metrological method in which the measured-data is approximated through polynomials. In addition, it is assumed that elastic distortions of the CMM are largely caused by the probing force only. Finally, taking into account the basic design of a portal-type CMM, additional assumptions are made regarding elastic bending which contribute most to the measurement deviations. FIG. 10 illustrates such a portal-type CMM. It consists of the machine table (21), the portal foot (22) moving horizontally on it in the Y-direction, with this portal carrying the so-called cross slide (23) guided in the X-direction on crossbar (22a), and the spindle (24) guided vertically in the Z-direction in cross slide (23) with the probe head (25) with the probe (26) being mounted on this spindle.

The CMM control is labeled (27) and the computer (28).

When a workpiece (29) is probed, the following elastic distortions essentially occur:

1. The relatively slim and lightly built spindle (24) bends as a function of its projection in the Z-direction opposite to the probing direction. This results in two error components xTx(z,F) and yTy(z,F).
2. Also, crossbar (22a) tilts about the bearing of the lateral guideway in portal foot (22). The amount of this motion depends on the leverage, i.e. on the position of cross slide (23) in the X-direction. This produces the error component yty(x,F).

Compared to these errors, the other elastic deviations of the portal-type CMM are negligible.

As the above consideration only takes into account elastic bending caused by the measuring force between probe (26) and workpiece (29), the influence of machine bending can be determined and mathematically compensated for in the same manner as the bending of probe (16). This is normally determined by providing the respective probe with a bending tensor, which describes the measurement deviation due to the probe bending according to the following coherence:

$$\vec{s}' = \vec{s} + N_T \vec{F}.$$

Here, s' is the deflection of the probe tip during the probing process, s the deflection measured by the measuring systems in the probe head (25), $N_T$ the bending tensor and $\vec{F}$ the measuring force built up between the probe tip and the workpiece. $N_T$ can generally be described as:

$$N_T = \begin{vmatrix} a_{11} & a_{21} & a_{31} \\ a_{12} & a_{22} & a_{32} \\ a_{13} & a_{23} & a_{33} \end{vmatrix} \quad (15)$$

The elements of this bending tensor are normally determined for each probe by probing a calibration sphere. However, as in the determination of the bending tensor not only the bending of the actual probe is measured, but also the elastic distortion of spindle (24) and crossbar (22a), the three afore-mentioned error influences can be established by determining bending tensor $N_T$ for an arbitrary probe in different points within the measuring volume of the machine, i.e., primarily with spindle (24) and cross slide (23) in different positions. In the subsequent evaluation, all that needs to be done is to separate the location-independent component of the bending tensor which describes the probe bending, and the elastic machine errors can then be calculated from the location-independent components of the bending tensor. In this method, the calibration of the probe bending becomes independent of the calibration site.

Figure 12:
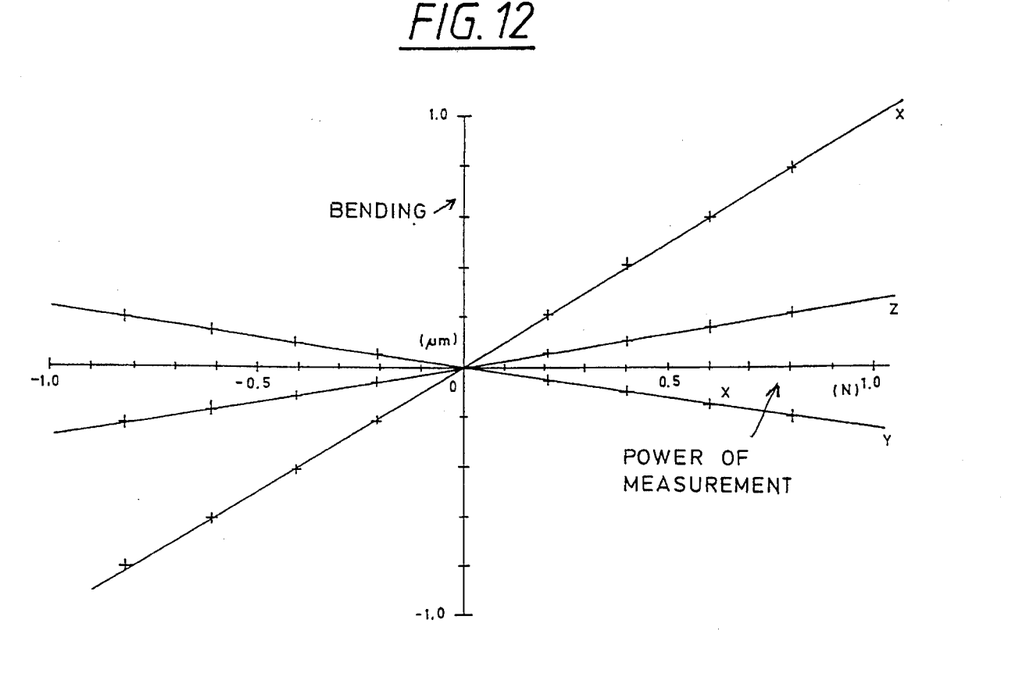
FIG. 12 is a diagram illustrating the change of the measured coordinate data on the test specimen according to FIG. 11b as a function of the probing forces in the three coordinate directions (x,y,z)
Figure 13A:
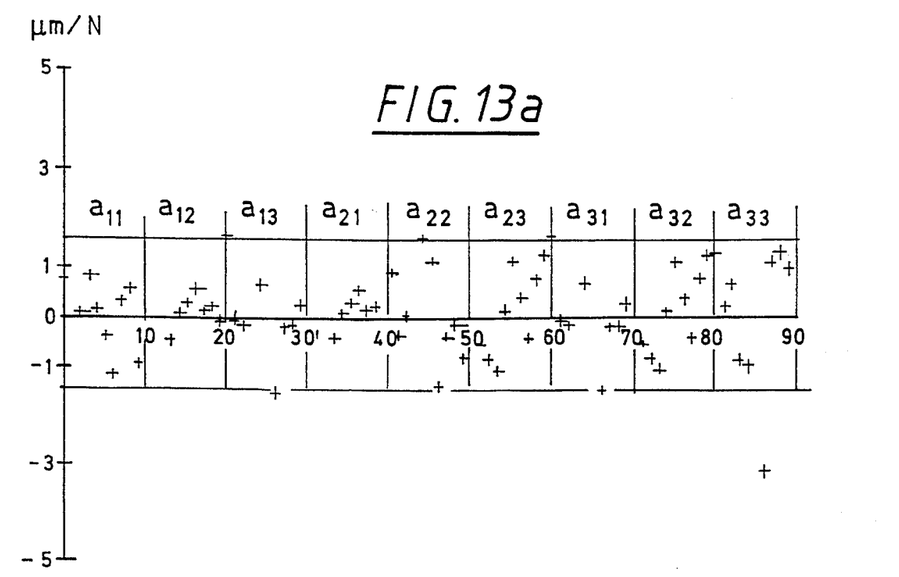
FIGS. 13a and 13b are diagrams in which the scattering of the elements of bending tensor $N_T$ defined from measured coordinate data are illustrated.
Figure 13B:
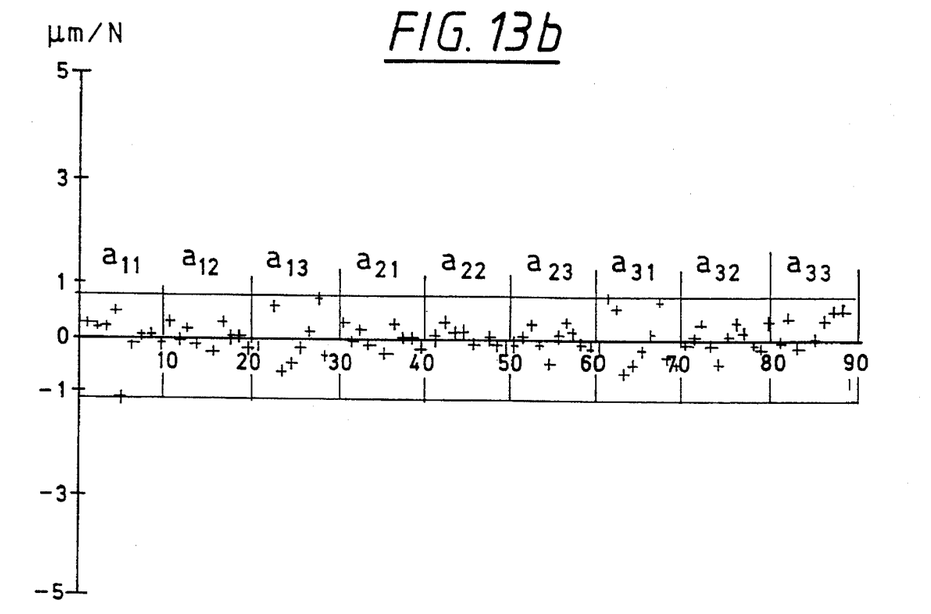

This is only possible if the bending tensor is determined as accurately as possible so that the location dependence and thus the machine bending can be reliably calculated. A very simple procedure was developed for this purpose, according to which the bending tensor is no longer established by probing a calibration sphere. Instead, a ball triplet (FIG. 11a) or roller triplet (FIG. 11b) is attached in different places within the CMM measuring volume similarly to a concave corner cube, and then probed in the self-centering mode. During probing, the measuring force is varied and the changes in the measured data as a function of the measuring force are recorded. In the diagram of FIG. 12, the changes in the measured data in the direction of the three coordinates X,Y and Z, obtained by applying nine different probing forces in the X-direction, are illustrated for an inclined probe. The incline of the three best fit lines directly yields the three elements of the first gap of the bending tensor. By applying measuring forces in the Y- or Z-direction, similar linear triplets are obtained which yield the elements of the second and third gaps of the bending tensor. This procedure has different advantages. For one, the drives of the measuring machine can be idle during the determination of the bending tensor, so that data is picked up relatively fast and the possibility of dynamic errors caused by the machine drives is eliminated. For the other, the determination of tensor elements is mathematically simple and stable due to the direct assignment of the best fit lines to the tensor elements, making iteration unnecessary. Finally, a mean value is obtained of several measuring forces which further increases the accuracy with which the tensor elements are determined. FIG. 13 shows the variation of the individual tensor elements, once for the first determination method by probing a calibration sphere, and once for the described second method of probing the roller triplet shown in FIG. 11b in self-centering mode and varying the measuring force (FIG. 13b). The illustrated values are the deviations from the measured data for the tensor element of the nine tensor elements of the bending tensor in μm/N, with ten tensor determinations having been performed in each case. It is obvious that the variation is reduced by 50% according to the second method.

Figure 14:
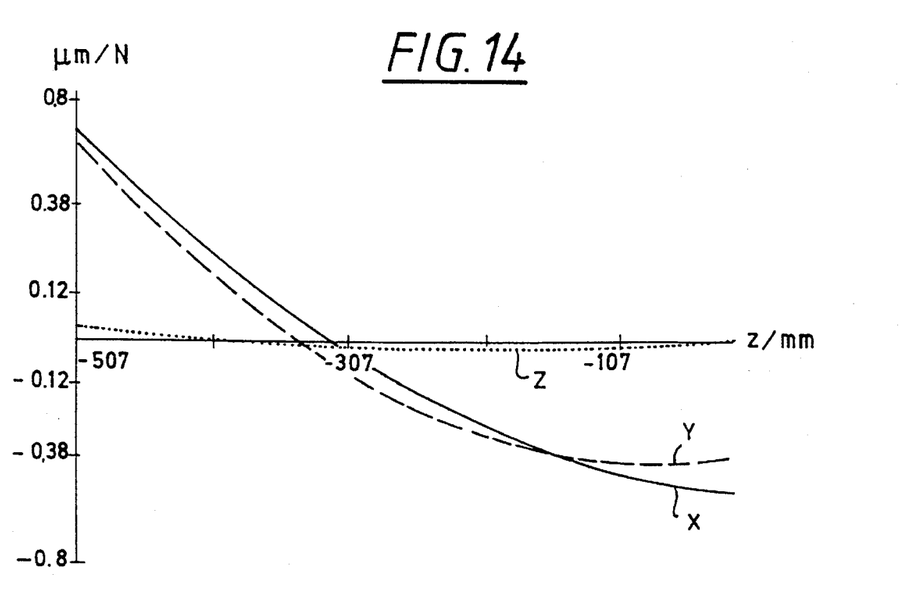
FIG. 14 is a diagram illustrating the rigidity of the X- and Y-axes of the CMM according to FIG. 10 as a function of the Z-position of the spindle (24)
Figure 15A:
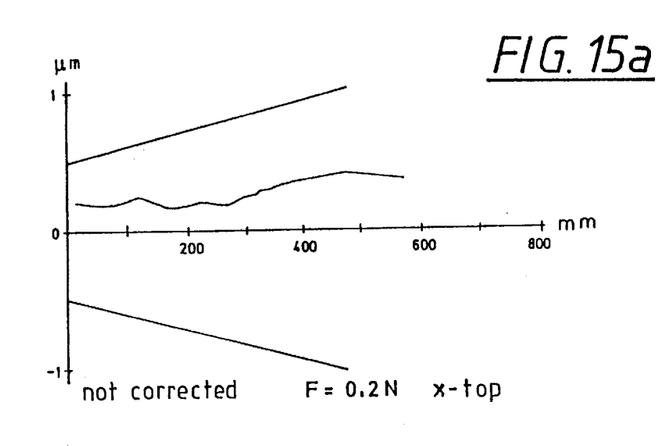
Figure 15B:
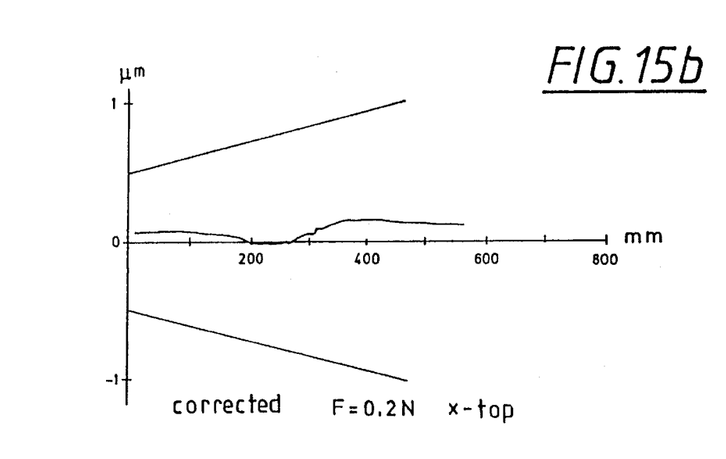
Figure 15C:
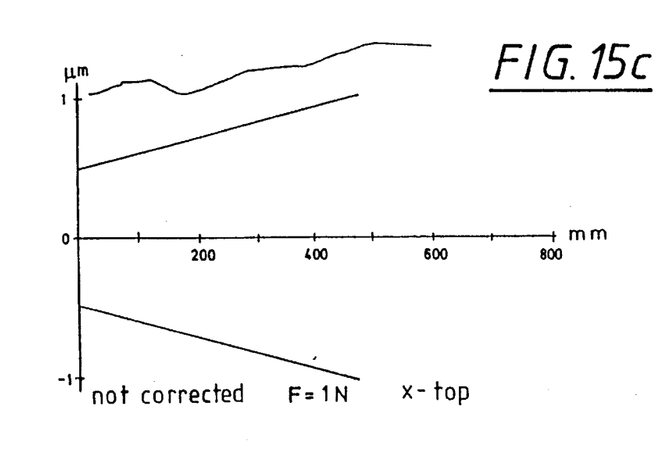
Figure 15D:
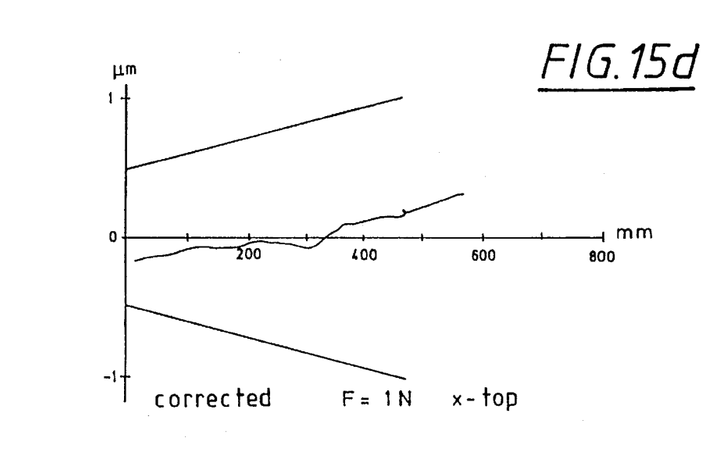
Figure 16A:
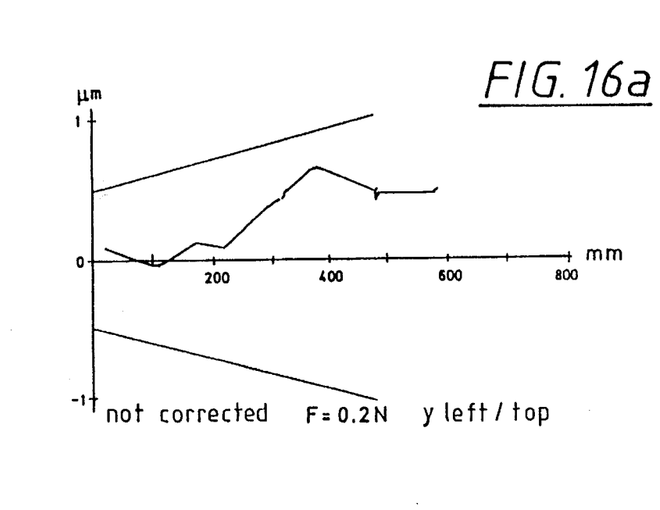
Figure 16B:
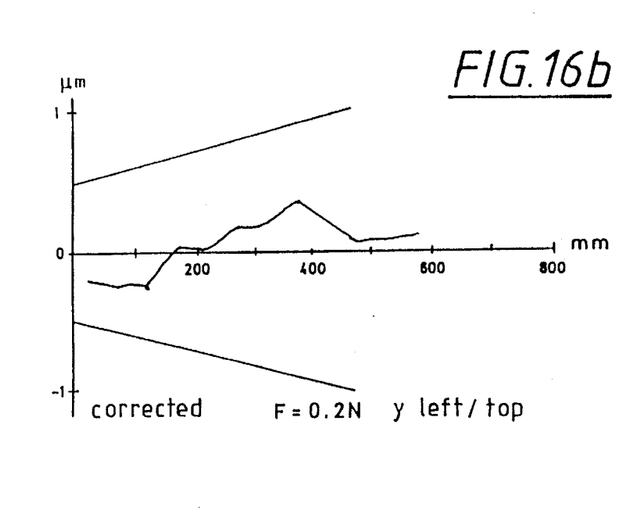
Figure 16C:
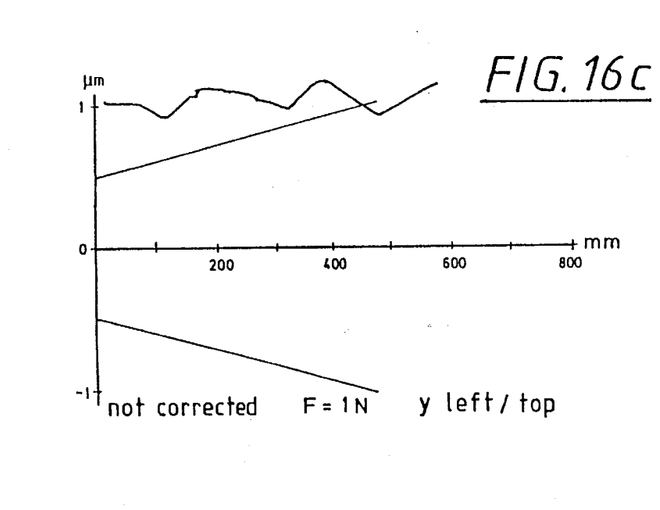
Figure 16D:
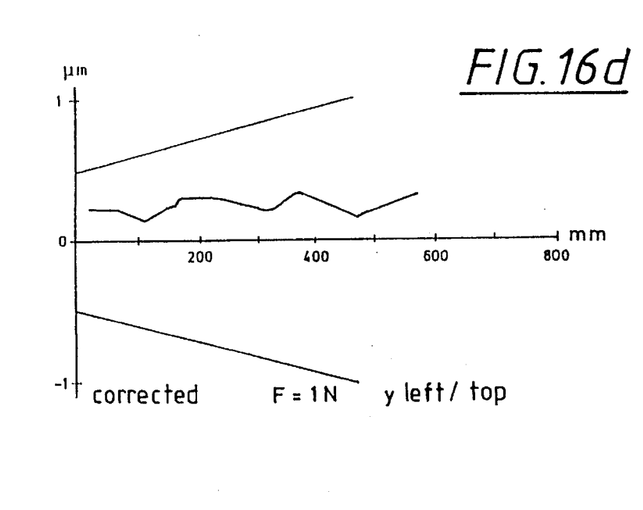

From the measured tensor elements, the elastic deviation of the CMM in the Y-direction due to a measuring force acting in the Y-direction and as a function of the X-position of cross slide (23) can be determined from the change in the tensor element $a_{22}$ on the X-position. Accordingly, the elastic deviation in the Y-direction due to a measuring force Fy also acting in the Y-direction as a function of the Z-position of the spindle is determined from the change in tensor element $a_{22}$ on the Z-position, and the elastic deviation in the X-direction due to a measuring force $F_x$ also acting in the X-direction as a function of the Z-position from the change in tensor element $a_{11}$ on the Z-position of the spindle (24). In FIG. 14, the rigidity of the X- and Y-axes in μm per Newton as a function of the Z-position of spindle (24) is illustrated as an example of such a measurement result.

It has been found that the machine bending characteristic can be very well approximated by a polynomial of the second order. The coefficients A0, A1 and A2 of these three polynomials Y=f(x), X=f(z) and Y=f(z) are determined by a best fit and stored as correction values in the microprocessor control (19) of the CMM.

When correcting coordinate measurement data on unknown workpieces, the values of the polynomial functions are then calculated from the stored coefficients for each measured coordinate value according to its position within the CMM measuring volume, multiplied by the measuring force used for the probing in question, and the product is used to correct the measured value.

FIGS. 15a–d and 16a–d show how successfully this correction is used in a UPMC-type horizontal-arm CMM of the firm Carl Zeiss, assignee of the inventors. In these figures, the measuring uncertainty of the CMM measured with a step gauge is illustrated for different measuring sites. The gauge block deviation curves in the extreme positions X above (FIG. 15) and Y left above (FIG. 16), each with measuring forces of 0.2N and 1N respectively, have been compared to each other with and without the correction of "elastic" errors. These gauge block deviation curves are measured using a Zerodur step gauge aligned in the above-mentioned X or Y measuring directions.

The effectiveness of the correction of elastic distortion of a CMM is best illustrated by comparing the displacement of the deviation curves which were determined without bending correction with those for which the elastic errors were corrected in the evaluation program.

In the illustrations in FIGS. 15 and 16, the ascending lines indicate the limits of the range specified as CMM measuring uncertainty. It is obvious that clearly better specifications can be issued for the machines corrected by the method according to the invention.

We claim:

1. A method for measuring coordinates on workpieces using a coordinate measuring machine having at least one measuring slide, a certain measuring range and a probe head with a probe fixed to said measuring slide, said method comprising the steps of establishing parameters characterizing elastic bending behavior of said coordinate measuring machine for several probe positions within said measuring range by determining components of said parameters, said components being dependent on position of said measuring slide and being at least dependent on a measuring force between said probe and workpieces to be measured, storing said components as correction values (c11, c22), and performing correction calculations by taking into account said stored correction values in subsequent coordinate measurements on workpieces.

2. Method according to claim 1, wherein said determining and storing steps comprise compiling and storing said correction values as a multi-dimensional correction table.

3. Method according to claim 2, further comprising performing said correction calculations by interpolating intermediate values between said correction values stored in said multi-dimensional correction table.

4. Method according to claim 2, in which said stored correction table is a function of said measuring force, and said measuring force is measured and measuring force is included in said correction calculations.

5. Method according to claim 1, further comprising approximating position dependence of correction values by mathematical functions (c11=F(z)).

6. Method according to claim 5, in which said mathematical functions are polynomials whose coefficients are stored for mathematical correction of measured position data.

7. Method according to claim 5, in which said mathematical functions are a function of said measuring force, and said measuring force is measured and measured force is included in said correction calculation.

8. Method according to claim 1, in which said correction values are elements of a bending tensor, further comprising determining bending tensor elements in advance by scanning a test specimen in succession in different positions within said measuring range of said coordinate measuring machine and probing said test specimen in said positions, with said measuring force applied to said test specimen being varied in amount and direction.

9. Method according to claim 8, wherein said test specimen is a concave component of a cube corner type, into which said probe of said coordinate measuring machine is insertable.

10. Method according to claim 1, further comprising determining static guideway deviations of said measuring slide from a straight-line, orthogonal coordinate system, calculating and storing further correction values on the basis of said static guideway deviations, and combining said further correction values with measured position data in subsequent measurements of workpieces.

11. Method according to claim 10, further comprising the following steps, not necessarily in stated order:

determining elastic bending of said coordinate measuring machine in a first calibration as a function of forces applied to said coordinate measuring machine, and calculating and storing a first set of correction value's, said first set of correction values being a function of coordinate measuring machine probe position within said measuring range of said coordinate measuring machine and measuring forces applied to said coordinate measuring machine by a workpiece during probing, determining static guideway deviations of said measuring slide in a second calibration, and determining and storing from said static guideway deviations a second set of correction values that is independent of measuring force, said second set of correction values being a function of said probe position within said measuring range of said coordinate measuring machine, and combining both sets of correction values with position data measured with said coordinate measuring machine in subsequent coordinate measurements on workpieces.

12. Method according to claim 10, further comprising determining dynamic deviations of said measuring slide with sensors during coordinate measurement on workpieces, determining a third set of correction values from said dynamic deviations, and using said third set of correction values for performing correction calculations.

13. Method according to claim 1, further comprising determining dynamic deviations of said measuring slide with sensors during coordinate measurement on workpieces, determining a third set of correction values from said dynamic deviations, and using said third set of correction values for performing correction calculations.

14. Method according to claim 13, in which said dynamic deviations of said measuring slide are recorded with said sensors in a time interval starting before contact is made with a workpiece, signals of said sensors are evaluated in this time interval, and dynamic correction values are determined with reference to a moment of contact with said workpiece.

15. Method according to claim 1, in which said components of parameters characterizing elastic bending behavior of said coordinate measuring machine are only determined and stored for selected combinations of measuring force and measuring position.

* * * * *